United States Patent [19]
Norris

[11] Patent Number: 4,985,714
[45] Date of Patent: Jan. 15, 1991

[54] FILM DISPENSER WITH ARTICULATED CATCHER

[75] Inventor: Philip R. Norris, North Reading, Mass.

[73] Assignee: Polaroid Corporation, Cambridge, Mass.

[21] Appl. No.: 468,238

[22] Filed: Jan. 22, 1990

[51] Int. Cl.$^5$ ............................................. G01D 15/00
[52] U.S. Cl. ................................... 346/107 R; 354/86; 354/304; 355/72
[58] Field of Search ...................... 355/72; 346/107 R; 354/83, 86, 304

[56] References Cited

U.S. PATENT DOCUMENTS

| | | | |
|---|---|---|---|
| 2,467,320 | 4/1949 | Land | 95/13 |
| 3,653,308 | 4/1972 | Erlichman | 95/13 |
| 3,748,990 | 7/1973 | Erlichman | 95/30 |
| 4,800,400 | 1/1989 | Douglas | 346/107 R |
| 4,804,982 | 2/1989 | Norris | 346/160 |
| 4,874,632 | 7/1989 | Norris | 346/107 R |

Primary Examiner—Michael L. Gellner
Attorney, Agent, or Firm—Edward S. Roman

[57] ABSTRACT

A dispenser of film units is operative with a film processing apparatus enclosed within a housing. The housing includes a front sidewall having an exit slot for delivery of film units, the dispenser including a film ejection device located behind the slot for ejecting film units out of the housing via the slot. The ejection device may include rotating pressure rolls which may also serve a function in the film processing. The dispenser includes a catcher constructed of a four-bar mechanical linkage, and includes a spring urging the catcher from an extended state away from the sidewall to a retracted state contiguous the sidewall. The catcher is supported pivotally by a strut assembly which pivots from the sidewall, and connects. A flap interconnects the tray with the sidewall. An articulation pivot permits a folding of the flap against the tray during retraction of the catcher. Force exerted by an exiting film unit overcomes the retractive spring force to deflect the tray to the extended catcher state. A hook assembly in the tray engages side edges of a film unit to hold the film unit flat against the tray and prevent a folding of the flap against the tray. Retraction is inhibited by the presence of the film unit in the catcher, and proceeds automatically by removal of the film unit from the cathcher tray.

10 Claims, 5 Drawing Sheets

FILM DISPENSER WITH ARTICULATED CATCHER

BACKGROUND OF THE INVENTION

This invention relates to a dispenser of film units from a film processing apparatus and, more particularly, to a dispenser positioned at an output film-delivery slot of the apparatus wherein the dispenser is constructed as an articulated film catcher which is extended by a film unit and retracted upon removal of the film unit.

As an example of film processing apparatus, there is considerable interest in apparatus operable with film units adapted for so-called instant photography wherein each film unit is constructed integrally with a packet of film-developing chemicals. Such apparatus is disclosed in Douglas, U.S. Pat. No. 4,800,400; Norris, U.S. Pat. No. 4,847,632; and Norris, U.S. Pat. No. 4,804,982. Such film processing apparatus generally includes an optical system for illuminating a photosensitive film for developing images on the film. Thereupon each film unit is advanced to a printing station having pressure driving rollers which grasp a leading edge of the film unit to express developing chemicals from the chemical-holding packet of the film unit. While the specific configurations of the film processing apparatus may vary, one class of apparatus of considerable importance herein employs a film exit slot positioned along a path of film conveyance at a location following the pressure driving rollers. This location of the exit slot presents a manufacturing convenience in that rotation of the rollers serves to deliver a processed film unit via the exit slot to persons who wish to receive the processed film units.

From a user standpoint, it is highly desirable that such apparatus presents successive film units in a manner allowing the user to either temporarily store or to withdraw selected dispensed film units. Moreover, it is desirable that an arrangement for providing these options occupy a minimum of space, be of simple construction, be effective, and low in cost.

A number of system approaches for film delivery have been provided with photographic cameras of the instant-developing type. Examples of such systems are disclosed in U.S. Pat. Nos. 2,467,320, and 3,653,308 and 3,748,990.

Of particular interest and convenience in use is a film printer apparatus with a foldable catcher assembly disclosed in the aforementioned Norris U.S. Pat. No. 4,847,632. Therein, the sidewall of a housing of the apparatus includes an exit slot positioned at a location following pressure driving rollers for delivering film ejected through the slot by rotation of the rollers. The catcher assembly is formed of four links of which the sidewall serves as one link. The film-supporting tray forms a second link, the tray being pivotally supported by a strut assembly which swings outward from the sidewall. The strut assembly serves as a third of the links. The fourth link is a flap which is pivotally connected between the tray and the sidewall and which, in an extended position of the catcher assembly serves as an extension of the tray, and folds up against the tray for a compact configuration during retraction of the catcher assembly to a position contiguous to the sidewall. In the retracted position, the tray acts as a door which closes off the exit slot. A feature of this catcher assembly is the use of an overcenter biased spring which retains the catcher assembly in either an extended state for delivery and storage of film units, or in the retracted state during a period of nonuse of the catcher assembly.

The foregoing Norris catcher assembly is convenient to use because a four-bar linkage can be activated by pressure of the leading edge of an ejected film unit to spring from the retracted state to the extended state. Excessive film units then stack up upon the extended tray. To this extent, the catcher assembly may be regarded as acting automatically.

However, the catcher assembly suffers from a disadvantage in that it is not fully automatic. Upon retrieval of all of the dispensed film units from the tray of the catcher assembly, the tray remains in the extended position. It is noted that the catcher assembly is of lightweight construction and, therefore, may be mishandled inadvertently if allowed to remain in the extended state during periods of nonuse of the assembly and the film processing apparatus. If the catcher assembly is to be retracted to the compact storage position, the retraction can be accomplished only manually by having a person push the catcher assembly back into the retracted position.

SUMMARY OF THE INVENTION

The aforementioned problem is overcome and other advantages are provided by a dispenser operative with a film exit slot and film ejection rollers of film processing apparatus. The dispenser has the general configuration of a four-bar mechanical linkage wherein one bar of the linkage is formed by a sidewall of a housing enclosing the film processing apparatus. An exit slot is provided in the sidewall for discharge of the film units from the housing. Some form of ejection device, such as rotating pressure driving rollers, is provided to forcibly deliver film units via the slot outward from the housing. In accordance with the invention, the dispenser includes a catcher formed of a tray pivotally supported by a strut assembly, both of which swing outward from the sidewall. The tray is connected in articulating fashion by a flap to the sidewall. The tray, the strut assembly, and the flap constitute, respectively, a second bar, a third bar, and a fourth bar of the foregoing four-bar linkage. Upon an outward swinging of the strut assembly, the tray and the flap extend forward of the side wall in a substantially coplanar relationship for support of film units. Upon a swinging of the strut assembly back towards the sidewall, the tray and flap fold against each other, in orientations essentially parallel to the sidewall, in a compact retracted state of the catcher. The tray is sufficiently long to extend along the sidewall beyond the slot so as to serve as a door for closing the slot in the retracted state of the catcher. Also included in the dispenser is a prestressed spring which continually urges the catcher from the extended state to the retracted state.

In accordance with a feature of the invention, automatic operation of the catcher is obtained by directing exiting film units towards the tray for urging the tray away from the sidewall. The film units have sufficient beam strength, namely, resistance to bending, to overcome the retractive force of the spring. Thereby, upon rejection of a film unit against the tray, the strut assembly swings outward away from the sidewall allowing the tray and the flap to assume the extended substantially coplanar orientation for support of the film unit.

In order to retain the catcher in the extended state against the retractive force of the spring, even after a film unit has been fully ejected from the slot to be totally supported by the catcher, the invention provides for the inclusion of a hook assembly integrally formed with the tray for slidably gripping side edges of the film unit as the film unit exits the slot to lie upon the tray. In this way, the first of the ejected film units is held against a coplanar surface of the tray. However, the length of the film unit exceeds the length of the tray and, therefore, extends back over the flap. Articulation of the catcher, accomplished by a folding of the flap towards the tray, is prevented by the presence of the film unit which is held securely against the tray by the hook assembly. Again, as noted above, the beam strength of the film unit is sufficient to overcome the retracted force of the spring so as to prevent the folding of the flap against the tray. Thereby, the catcher is immobilized by the presence of the first of the ejected film units.

Subsequent film units can readily stack upon the first film unit and the catcher which thereby stores the film units in a position which allows a person to examine selected ones of the film units. Upon removal of all of the film units from the catcher, the flap is then free to fold against the tray in response to the retractive force of the spring. Thereby, the spring urges articulation of the catcher to the retracted state. This operation is fully automatic in the sense that the extended state of the catcher is brought upon automatically by ejection of a film unit, and retraction of the catcher is brought upon by removal of film units from the catcher.

BRIEF DESCRIPTION OF THE DRAWING

The aforementioned aspects and other features of the invention are explained in the following description, taken in connection with the accompanying drawing wherein.

DETAILED DESCRIPTION

Figure 1:
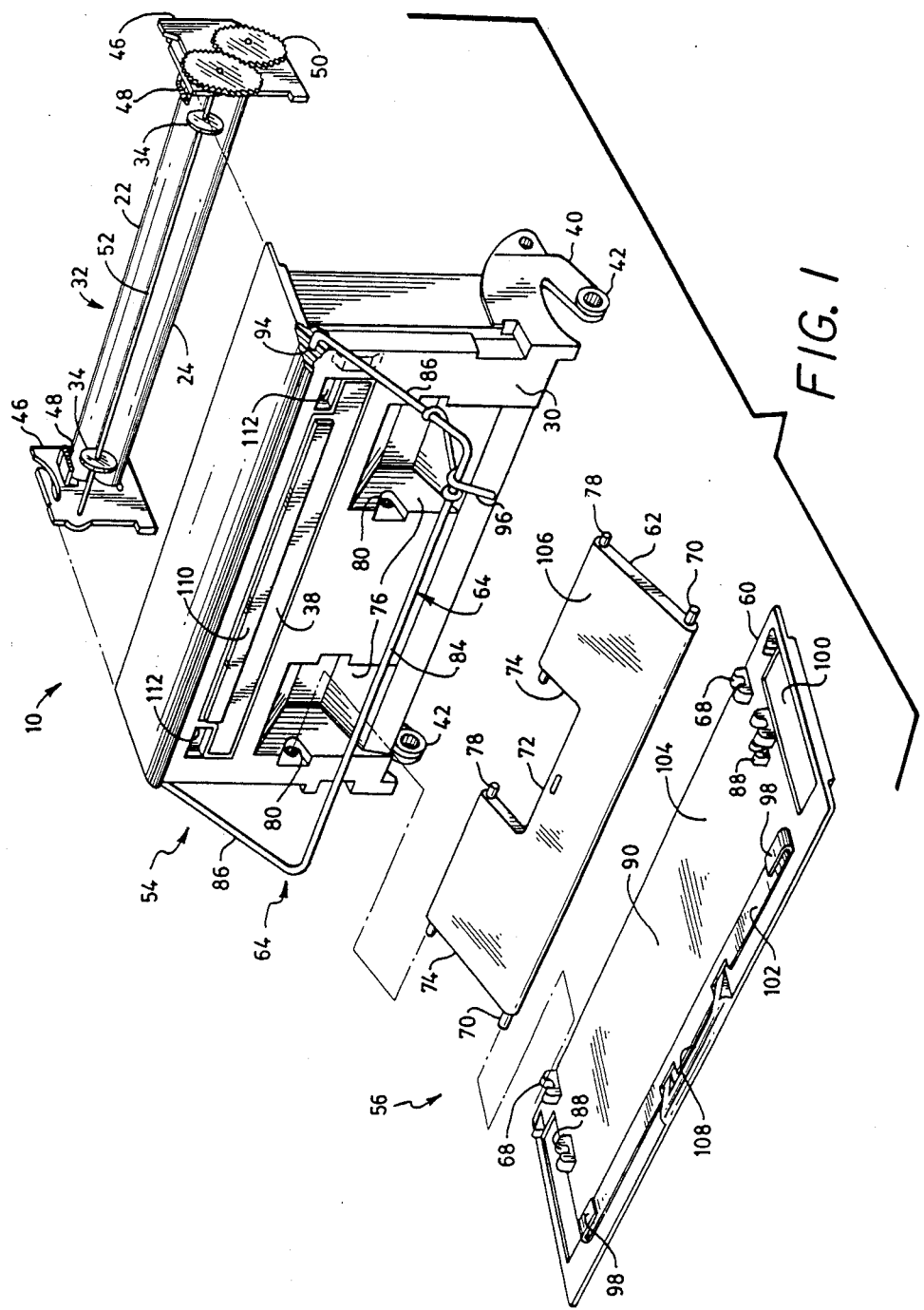
FIG. 1 is an exploded view of a dispenser constructed in accordance with the invention.
Figure 2:
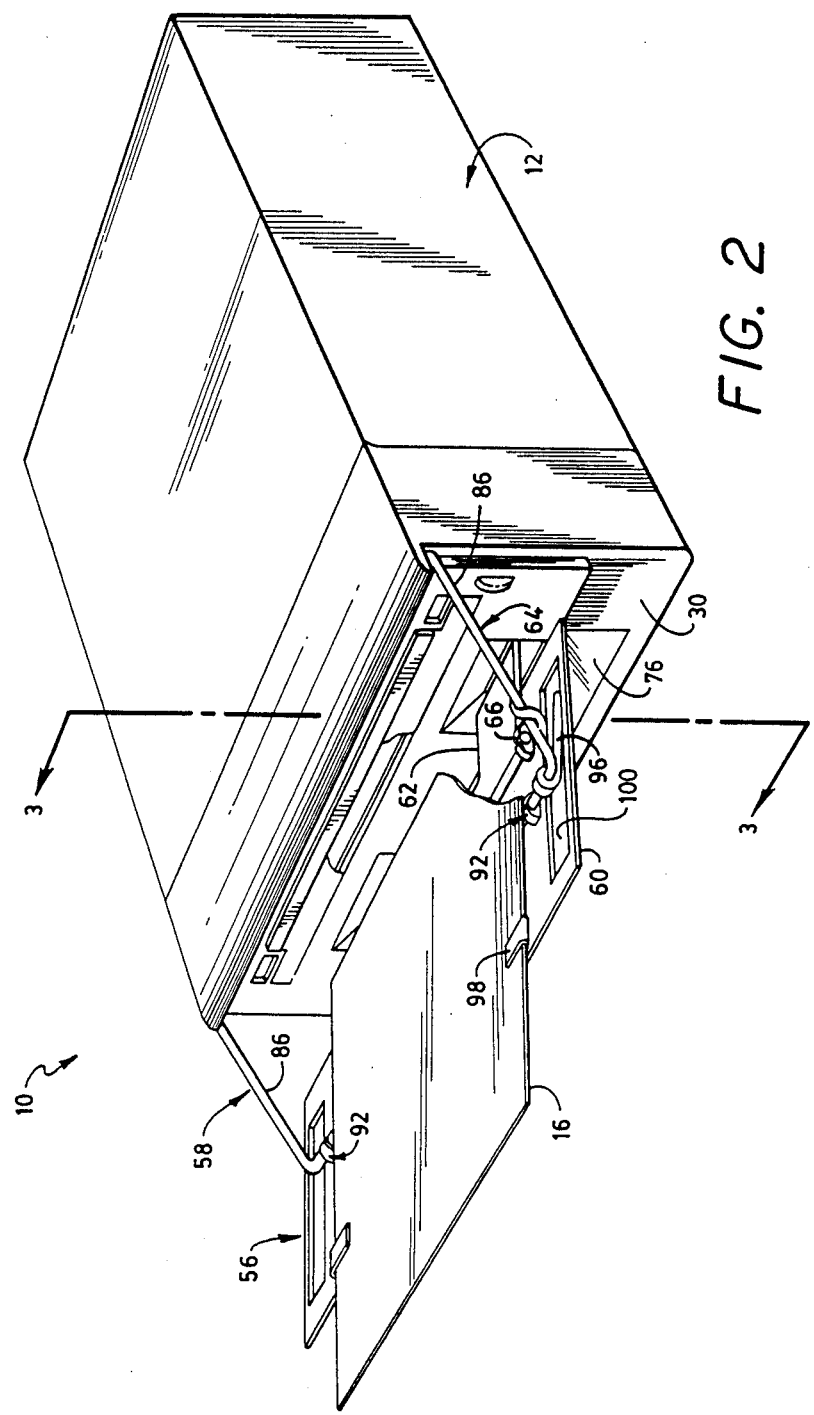
FIG. 2 is a perspective view of a housing which encloses film-processing apparatus, the housing having a front sidewall supporting a catcher of the dispenser in an extended state for supporting a film unit.
Figure 3:
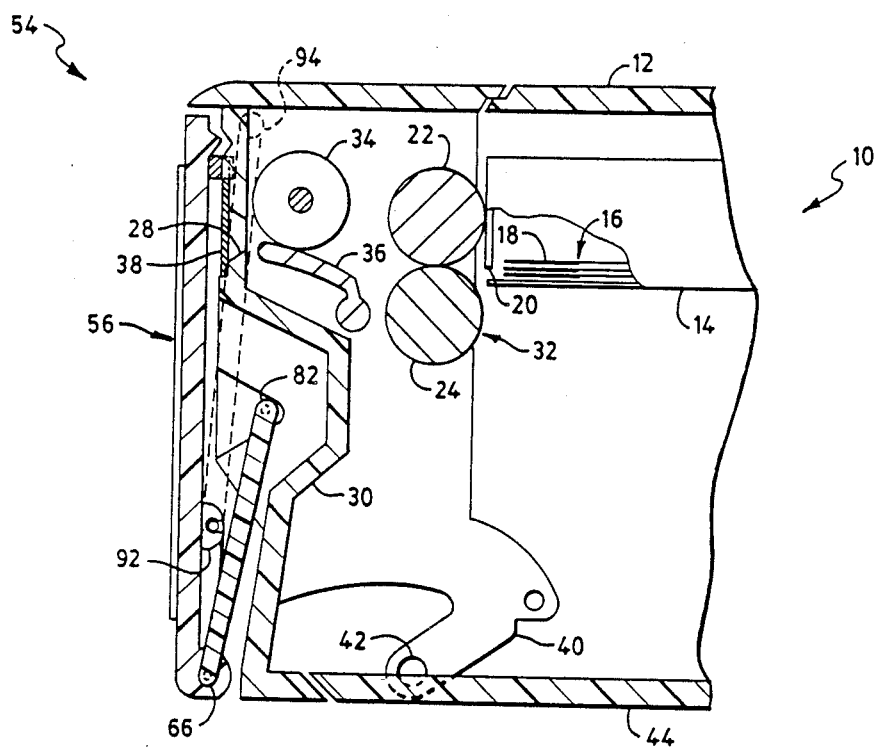
FIG. 3 is a sectional view, taken along the line 3—3 in FIG. 2, showing a front portion of the housing with a portion of film processing apparatus including an ejection device enclosed by the housing, the view also showing the catcher in a retracted state.

With reference to FIGS. 1–4 there is shown a portion of film processing apparatus 10 suitable for the practice of the invention. By way of example, the apparatus 10 comprises a housing 12 with a cassette 14 therein for holding a stack of film units 16, each of which has an image to be printed By way of example, a film unit 16 may be of the instant photography type, such as that manufactured by the POLAROID CORPORATION of Cambridge, Mass., wherein the film unit 16 includes a packet 18 of developer chemicals for use in developing the film unit 16 to obtain a print of the image on the film unit 16. The cassette 14 may also be of a well known form used in the processing of the foregoing type of film units, and is operative with a known film-picking mechanism (not shown) which urges a bottommost exposed film unit 16 through an aperture 20 in the cassette 14 to a pair of pressure rollers 22 and 24. The rollers 22 and 24 rotate, as indicated by arrows, to grab a leading edge of the film unit 16, and to advance the film unit 16 along a path 26 indicated by a dashed line. There is a small gap (not shown) between the rollers 22 and 24 by which the rollers 22 and 24 can receive the packet 18 at the leading edge of the film unit 16 and spread the developer chemicals along the film unit 16 as the unit 16 advances between the rollers. As is well known, the spreading of the developer chemicals serves to develop the film to produce a print on the film unit 16.

The rollers 22 and 24 serve the dual functions of participating in the processing of the film units 16, and also in ejecting processed film units 16 via an exit slot 28 in a sidewall 30 of the housing 12 to a person using the apparatus 10. Therefore, the rollers 22 and 24 may be regarded as constituting a part of a film ejector 32 which ejects processed film units 16 via the slot 28. The ejector 32 further comprises a pair of friction type film transfer wheels 34 operative with a guide element 36 located down the path 26 from the rollers 22 and 24. The two rollers 22 and 24, the wheels 34, and the guide element 36 operate to direct a film unit 16 with a predetermined orientation as the film unit 16 exits the slot 28. The slot 28 is provided with a flexible cover flap 38 which is deflected away from the path 26 by the leading edge of a film unit 16. For convenience in use, the ejector 32 may be provided with an arm 40 which engages with a pivot 42 located on a bottom wall 44 of the housing 12. The arm 40 allows the ejector 32 to be pivoted away from the remainder of the housing 12 to provide an access port for placing the cassette 14 in the housing 12. Upon a pivoting of the ejector 32 back into the position shown in FIGS. 3–4, the ejector 32 acts as a closure element or door of the housing 12.

The operation of the rollers 22 and 24 and the wheels 34 is described in the aforementioned patent to Norris U.S. Pat. No. 4,847,632. Briefly, as shown in FIG. 1, the rollers 22 and 24 are supported rotatably by brackets 46. Springs 48 are attached to the bracket 46 to urge the roller 24 against the roller 22 for spreading the chemicals from the packet 18 during passage of a film unit 16 between the rollers 22 and 24. Gearing 50 connects the rollers 22 and 24 to a motor (not shown) to impart rotation to the rollers 22 and 24. A drive shaft 52 supports the wheels 34 and connects with the gearing 50 to rotate the wheels 34. The wheels 34 are located on the shaft 52 at positions for engagement with opposed side edge regions of each film unit 16.

In accordance with the invention, the apparatus 10 is provided with a dispenser 54 which includes the ejector 32, and further comprises a catcher 56 mounted to the housing 12 in front of the sidewall 30 for receiving film units 16 dispensed via the slot 28. The catcher 56 supports dispensed film units 16 at a place of convenience for a person using the apparatus 10, and allows the person to select individual ones of the film units 16.

The catcher 56 is constructed in the basic configuration of a four-bar mechanical linkage 58. One element of the linkage 58 is the sidewall 30. The other three elements of the linkage 58 are a tray 60, a flap 62, and a strut assembly 64. The four elements are pivotally connected to each other so as to permit the catcher to be extended from the housing 12 to an extended state for support of film units 16, and to be retracted to a retracted state in which the four elements are in a compact articulated configuration at the front of the housing 12.

Figure 4:
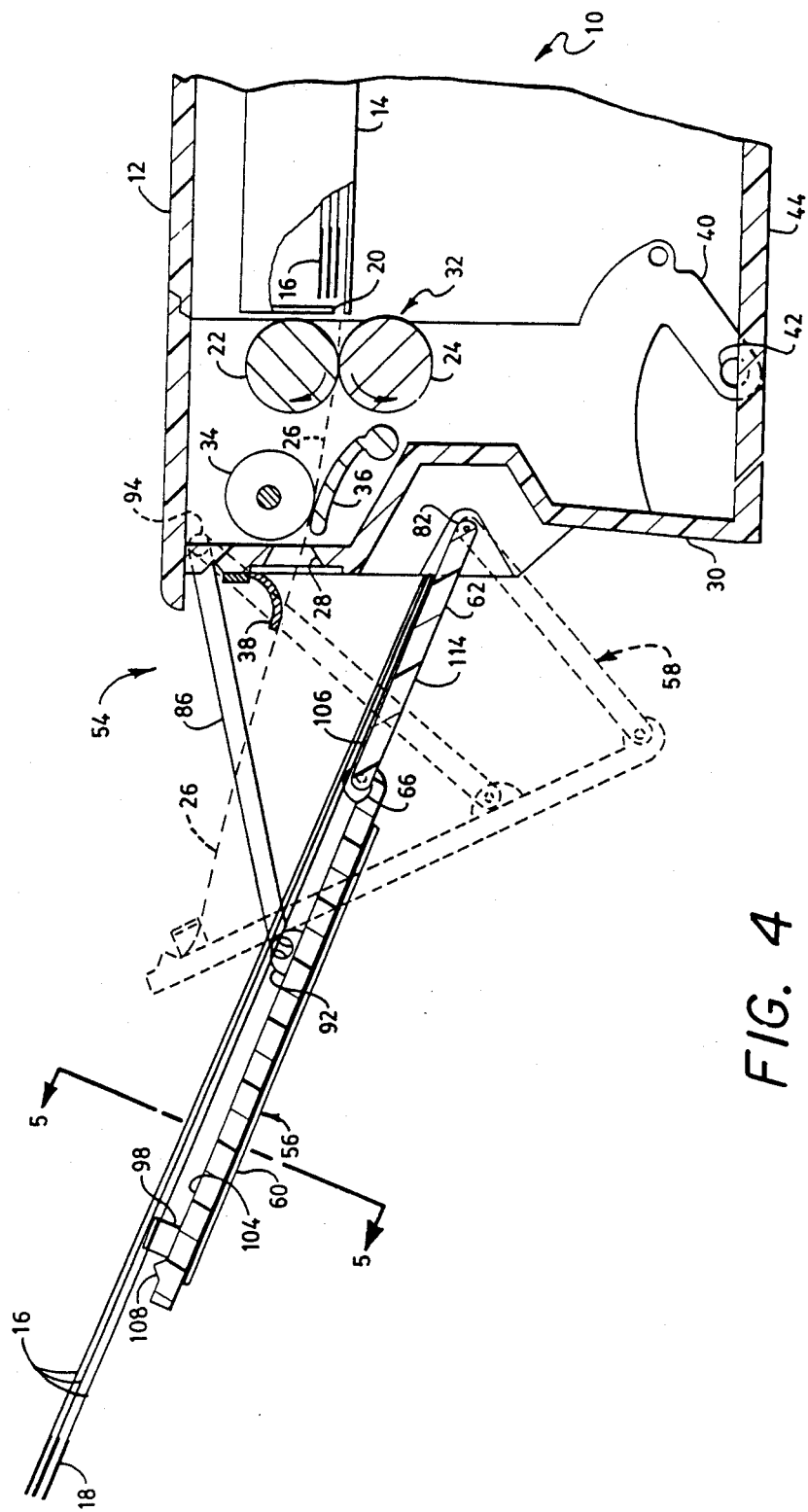
FIG. 4 is a sectional view, similar to that of FIG. 3, but with the catcher in an extended state.

The tray 60 and the flap 62 are joined by an articulation pivot 66 which joins a proximal edge region of the tray 60 to a distal edge region of the flap 62. The pivot 66 allows the flap 62 to fold against the tray 60 in the retracted state (FIG. 3), and to extend in a substantially coplanar configuration with the tray 60 in the extended state (FIG. 4). The pivot 66 comprises a pair of brackets 68 located on opposite sides of the tray 60 and a pair of pins 70 located on opposite sides of the flap 62 and received by the brackets 68. The pivot 66 allows pivoting in a range of from zero degrees, in the retracted state, to approximately 180 degrees, in the extended state, the latter pivot limitation arising from a contacting of the proximal edge of the tray 60 with a backside of the distal edge region of the flap 62.

The proximal edge region of the flap 62 is constructed with a notch 72 which defines two legs 74 which extend into recesses 76 in the sidewall 30. The legs 74 are provided with pins 78 which fit into sockets 80 in the recesses 76 to form pivots 82 by which the flap is pivotally connected to the sidewall 30.

The strut assembly 64 is formed as a single wire which is bent to form a central portion 84 and two struts 86 which extend perpendicularly to the central portion 84. Brackets 88 are located on a middle portion 90 of the tray 60, and engage the central portion 84 to form pivots 92 which pivotally secure the central portion 84 to the middle portion 90 of the tray 60. The struts 86 extend from the brackets 88 to pivots 94 located at the upper outer corners of the sidewall 30.

In accordance with a feature of the invention, automatic extension and retraction of the catcher 56 is provided by a spring 96, and a hook assembly comprising a pair of hooks 98 disposed on opposite sides of the tray 60 and retracted from edges of the tray 60 for engagement with edges of a film unit 16. The spring 96 is formed of a segment of spring steel wire secured to the strut assembly 64 by coiling a portion of the wire around an end of the central portion 84 and looping an end of the wire around the contiguous strut 86 to establish a firm mounting of the spring 96 to the strut assembly 64. In the exploded view of FIG. 1, wherein the components of the catcher are shown separated from each other, the spring 96 is portrayed in its unstressed state In the assembled view of the catcher 56 in FIG. 2, the spring 96 is shown in its operating configuration wherein the spring 96 is bent into a stressed state with an end of the spring 96 being located in a depression 100 of the tray 60 for urging the tray 60 to pivot via the pivots 92 about the central portion 84 to the retracted state of the catcher 56. The spring 96 is biased in all positions of the catcher 56 to urge the catcher 56 toward the retracted state.

In the construction of the hook assembly, the hooks 98 are formed of a metal strip 102 having end portions in the form of tabs which are bent back over the strip 102 to produce the hooks 98. The tray 60 has sufficient length, between its proximal and distal edges, to extend over the film-exit slot 28 in the sidewall 30, in the retracted state of the catcher 56 (FIG. 3), so as to serve as a door which closes over the slot 28. With reference to the retracted state, the hook strip 102 is located between the slot 28 and the distal edge of the tray 60. Therefore, an exiting film unit 16 strikes the tray 60 at a location between the hook strip 102 and the pivots 92 for urging the tray 60 away from the sidewall 30 to extend the catcher 56. The location of the hook strip 102 is retracted from the distal edge of the tray 60 to enable a clamping of a film unit 16 to a top surface of the catcher 56, as shown in FIG. 4, the top surface of the catcher 56 being a composite of the top surfaces 104 and 106 of the tray 60 and the flap 62, respectively. A ramp 108 is located on the top surface 104 of the tray 60 between the hook strip 102 and the distal edge of the tray 60, and extends outward from the tray 60 to engage the leading edge of the film unit 16 during extension of the catcher 56.

In operation, a film unit 16 exiting from the slot 28 automatically extends the catcher 56 to the extended state, and maintains the catcher 56 in the extended state until removal of the film unit 16, at which time the spring 96 returns the catcher 56 to the retracted state. If desired, a magnet 110 may be mounted to the top of the sidewall 30, at a location in registration with the hook strip 102 in the retracted state, to magnetically attract the hook strip 102 for securing the tray 60 to the sidewall 30 during the retracted state. For use with the magnet 110, the hook strip 102 is to be fabricated of iron or steel, such as spring steel, so as to be attracted to the magnet 110. The tray 60, the flap 62, and elements of the housing 12 may be fabricated of nonmagnetic material, preferably plastic Recesses 112 are provided in the sidewall 30 for receiving the hooks 98 during the retracted state.

The extension of the catcher 56 begins with contact of the leading edge of an exiting film unit 16 with the tray 60. The beam strength, or stiffness, of the film unit 16 is great enough to overcome forces of the spring 96 and the magnet 110 to swing the tray 60 away from the sidewall 30. The pivots 92 are located in a region approximately from one-quarter to one-half the distance, preferably one-third the distance, from the proximal edge to the distal edge of the tray 60 to facilitate a pivoting of the tray 60 about the pivots 92 and 66 for opening the catcher 56 to the extended state. As the catcher 56 opens, the leading edge of the film unit 16 slides through the hooks 98 to contact the ramp 108. The ramp 108 serves as a bumper to retain the leading edge of the film unit 16 in engagement with the tray 60 to ensure continued pivoting of the tray 60 during the initial stages of the extension of the catcher 56. During the final stages of ejection of the film unit 16 and of extension of the catcher 56, the leading edge of the film unit 16 slides up and over the ramp 108, which operates to bow the film 16 as best shown in the cross-sectional view of FIG. 5. The trailing edge of the film unit 16 thereafter drops down upon the flap 62 to assume the position of film unit shown in FIG. 4. The catcher 56 is now in the fully extended position.

Figure 5:
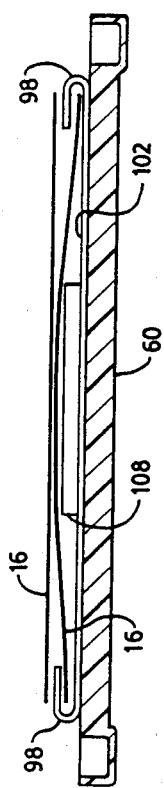
FIG. 5 is a sectional view taken along the lines 5—5 in FIG. 4.

In the extended state of FIG. 4, it is noted that the leading edge of the film unit 16 no longer pushes against the tray 60 to overcome the force of the spring 96. Nevertheless, the spring 96 is unable to retract the catcher 56 because the film unit 16 is acting as a locking member for locking the catcher 56 in the extended state. As shown in FIG. 4, a front portion of the film unit 16 is clamped between the hooks 98 (only one of the hooks being visible in this view) and the ramp 108. This clamping forces a rear portion of the film unit 16 against the flap 62 to prevent articulation at the pivot 66. As a result, the spring 96 is ineffective to fold the catcher 56. The catcher 56 is retained in its extended state to allow further ejected film units 16 to stack up upon the first film unit which is serving as the locking member. Also, the bowing of the first film unit by the ramp 108 as shown in FIG. 5 allows the succeeding film units to be ejected over the hooks 98 without stubbing. A person using the film processing apparatus 10 is now free to inspect film units delivered by the ejector 32 to the catcher 56.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. A dispenser of film units delivered by film processing apparatus enclosed in a housing, the dispenser comprising:

a sidewall of said housing and an exit slot in the sidewall, the exit slot serving for discharge of the film units from the housing;

ejection means disposed in said housing for ejecting individual ones of the film units from said housing by said slot;

a catcher having retracted and extended states relative to said housing, said catcher having a tray and being mounted to said housing outside said sidewall, said catcher being extendible from said housing to said extended state for catching individual ones of the film units on said tray upon passing of the film units via said slot, said catcher closing said tray against said sidewall upon a retraction of said catcher to said retracted state; and wherein said catcher further comprises a spring biased in all positions of said catcher to urge said catcher into said retracted state; and said ejecting means urges individual ones of said film units against said tray with sufficient force to overcome a retractive force of said spring and to deflect said tray away from said sidewall for supporting individual ones of said film units, deflection of said tray placing said catcher in said extended state, said tray engaging with an individual one of said film units for maintaining said catcher in said extended state, said spring automatically retracting said catcher upon an emptying of said tray of film units.

2. A dispenser according to claim 1 wherein, in said retracted state, said tray extends away along said sidewall past said slot to serve as a door which closes said slot in said retracted state.

3. A dispenser according to claim 1 wherein said catcher further comprises hook means on said tray for holding a film unit in engagement with said tray during said extended state of said catcher.

4. A dispenser according to claim 1 wherein said catcher further comprises a strut extending from said housing to said tray, said strut being movable relative to said housing and relative to said tray for orienting said tray alongside said sidewall during said retracted state, and for extending said tray from said sidewall in said extended state for supporting film units.

5. A dispenser according to claim 1 wherein said catcher further comprises a flap extending from said housing to said tray, said flap having a proximal edge and a distal edge opposite said proximal edge, said proximal flap edge being pivotally connected to said housing, said distal flap edge being pivotally connected to a first edge region of said tray by an articulation pivot to permit articulation of said catcher during said retracted state, said flap being substantially coplanar with said tray in said extended state to serve as an extension of said tray for support of a trailing end of a film unit, pressure of said trailing end of said film unit against said flap restraining said catcher from articulation into said retracted state.

6. A dispenser according to claim 5 wherein said tray has a second edge region opposite said first edge region; and said catcher further comprises hook means located in said second edge region of said tray for holding a film unit in engagement with said tray and said flap in said extended state of said catcher.

7. A dispenser according to claim 6 wherein said catcher further includes ramp means located in said second edge region of said tray for bowing the first film unit to enable the next succeeding film units to clear said hook means.

8. A dispenser according to claim 7 wherein said articulation pivot has a limited range of pivoting extending from approximately zero degrees in the retracted state of said catcher to approximately 180 degrees in the extended state of said catcher.

9. A dispenser according to claim 6 wherein said tray has a middle region located between said first and said second edge regions; and said catcher further comprises a strut extending from said housing to said middle region of said tray, a proximal end of said strut being pivotally connected to said housing and a distal end of said strut being pivotally connected to said middle region of said tray for supporting said tray in both said retracted and said extended states.

10. A dispenser according to claim 8 wherein said ejection means directs a leading edge of a film unit against said tray past a location between said hook means and said middle region for urging said tray into an orientation for support of the film unit.

* * * * *